United States Patent
Barrett

(10) Patent No.: US 10,250,456 B2
(45) Date of Patent: Apr. 2, 2019

(54) OPERATIONAL MANAGEMENT IN CLOUD COMPUTING SYSTEMS

(71) Applicant: Microsoft Technology Licensing, LLC, Redmond, WA (US)

(72) Inventor: Dan Barrett, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 282 days.

(21) Appl. No.: 15/157,204

(22) Filed: May 17, 2016

(65) Prior Publication Data

US 2017/0339027 A1    Nov. 23, 2017

(51) Int. Cl.
  *H04L 12/24* (2006.01)
  *H04L 12/26* (2006.01)
  *H04L 29/08* (2006.01)
  *H04L 12/931* (2013.01)
  *G06F 9/50* (2006.01)

(52) U.S. Cl.
  CPC ........ *H04L 41/5009* (2013.01); *G06F 9/5072* (2013.01); *H04L 43/0823* (2013.01); *H04L 43/14* (2013.01); *H04L 43/16* (2013.01); *H04L 49/35* (2013.01); *H04L 67/10* (2013.01)

(58) Field of Classification Search
  CPC ............. H04L 41/5019; H04L 43/0876; H04L 67/1008; H04L 67/1023; H04L 43/0816; H04L 47/20; H04L 41/50; H04L 43/0823; H04L 43/14; H04L 43/16; H04L 49/35; H04L 67/10; G06F 9/5072
  USPC ........................................................ 709/224
  See application file for complete search history.

(56) References Cited

U.S. PATENT DOCUMENTS

| | | | |
|---|---|---|---|
| 6,484,120 B1 * | 11/2002 | Goto | G01D 5/204 324/207.11 |
| 6,823,382 B2 | 11/2004 | Stone | |
| 7,107,491 B2 | 9/2006 | Graichen et al. | |
| 7,467,192 B1 | 12/2008 | Lemler et al. | |
| 7,471,293 B2 | 12/2008 | Clymer et al. | |
| 7,734,765 B2 | 6/2010 | Musman et al. | |
| 8,037,365 B2 | 10/2011 | Goldstein et al. | |
| 8,396,807 B1 | 3/2013 | Yemini et al. | |
| 8,954,979 B1 | 2/2015 | Myers et al. | |
| 9,069,730 B2 | 6/2015 | Talwar et al. | |

(Continued)

OTHER PUBLICATIONS

"International Search Report and Written Opinion Issued in PCT Application No. PCT/US17/032304", dated Jul. 24, 2017, 11 Pages.

(Continued)

*Primary Examiner* — Patrice L Winder
*Assistant Examiner* — Aye M Aung
(74) *Attorney, Agent, or Firm* — Liang IP, PLLC

(57) ABSTRACT

Techniques for managing operation in cloud computing systems are disclosed herein. In one embodiment, a method can include receiving data representing a guaranteed value of a performance metric of a cloud service and an error budget and deriving a switching threshold based on a combination of the value of the performance metric and the error budget. The method also includes determining a current value of the performance metric of the cloud service and causing the cloud computing system to selectively switch between operational modes for providing the cloud service based on a comparison between the determined current value of the performance metric and the switching threshold.

20 Claims, 6 Drawing Sheets

(56) References Cited

U.S. PATENT DOCUMENTS

| | | | |
|---|---|---|---|
| 9,122,572 B2 | 9/2015 | Bird et al. | |
| 9,569,248 B2* | 2/2017 | Apte | G06F 8/60 |
| 2003/0034995 A1 | 2/2003 | Osborn et al. | |
| 2005/0240933 A1* | 10/2005 | Barsness | G06F 9/485 |
| | | | 718/105 |
| 2007/0124727 A1* | 5/2007 | Tennyson | H04L 5/1446 |
| | | | 717/158 |
| 2007/0226228 A1 | 9/2007 | Her et al. | |
| 2007/0226341 A1* | 9/2007 | Mateo | H04L 12/66 |
| | | | 709/226 |
| 2007/0263541 A1 | 11/2007 | Cobb et al. | |
| 2010/0077149 A1* | 3/2010 | Moyer | G06F 12/0864 |
| | | | 711/128 |
| 2012/0210173 A1* | 8/2012 | Schloegel | G06F 11/3608 |
| | | | 714/37 |
| 2012/0240135 A1* | 9/2012 | Risbood | G06F 9/44505 |
| | | | 719/328 |
| 2013/0326051 A1* | 12/2013 | LeGendre | H04L 43/0817 |
| | | | 709/224 |
| 2014/0297833 A1 | 10/2014 | Bedini et al. | |
| 2015/0281113 A1 | 10/2015 | Siciliano et al. | |
| 2016/0034292 A1* | 2/2016 | Cao | G06F 9/45558 |
| | | | 718/1 |
| 2016/0164797 A1* | 6/2016 | Reque | G06F 9/445 |
| | | | 718/1 |
| 2016/0292028 A1* | 10/2016 | Gamage | G06F 11/079 |
| 2017/0041347 A1* | 2/2017 | Nagaratnam | H04L 63/20 |

OTHER PUBLICATIONS

Poola, et al., "Robust Scheduling of Scientific Workflows with Deadline and Budget Constraints in Clouds", In Proceedings of the IEEE 28th International Conference on Advanced Information Networking and Applications, May 13, 2014, pp. 858-865.

Hill, Patrick, "Love DevOps? Wait 'till you meet SRE", Published on: Mar. 13, 2016 Available at: https://www.atlassian.com/it-service/site-reliability-engineering-sre.

* cited by examiner

OPERATIONAL MANAGEMENT IN CLOUD COMPUTING SYSTEMS

BACKGROUND

Remote or "cloud" computing typically utilizes a collection of remote servers in datacenters to provide computing, data storage, communications, or other cloud services. A communications network can interconnect the remote servers as nodes to form one or more computing clusters in datacenters. During operation, one or more nodes in the datacenters can cooperate to provide a distributed computing environment that facilitates execution of various applications in order to provide various cloud services.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

To facilitate cloud services, a team of developers create software applications deployable in a computing system to provide a cloud computing platform with associated utility applications. The team of developers can also switch operations to improving performance of already deployed software applications by fixing bugs, optimizing processes, or applying other enhancement techniques to existing software applications. However, in certain computing systems, determining at which point to switch from developing new builds to improving performance of existing software applications can be difficult. If operations are mainly focused on developing new builds of software applications, performance of the existing software applications may suffer. On the other hand, excessive focus on improving performance of existing software applications can delay or limit deployment of new builds with updated or new features desired by users.

Several embodiments of the disclosed technology utilize a combination of guaranteed values of performance metrics according to service level agreements ("SLAs") and associated error budgets to determine a switching threshold for selectively shifting operations in cloud computing systems. Cloud service providers typically have service level agreements that specify certain guaranteed values of performance metrics. For example, SLAs can specify guaranteed values for service uptime, network accessibility, power availability, number of scheduled maintenance, percentages of allowed error, or other performance metrics. Each performance metric can have an associated error budget that identifies an allowable percentage of errors based on the guaranteed value of the performance metric.

In certain embodiments, a cloud computing system can include an operation controller that is configured to determine a switching threshold based on a guaranteed value and an associated error budget. For example, the switching threshold can be derived by subtracting a guaranteed value of a performance metric specified by an SLA and an associated error budget from a value of the performance metric corresponding to error-free operation. Thus, if a value corresponding to error-free operation is 100%, then subtracting an SLA guaranteed value (e.g., 90%) and an error budget (e.g., 3%) from 100% would yield a switching threshold of 7%. As such, an actual error rate of 8% would exceed the switching threshold while another error rate of 1% would not. In other embodiments, the operation controller can also derive the switching threshold by summing the guaranteed value and the error budget, incorporating hysteresis, or applying other suitable synthesis techniques.

In certain embodiments, when an actual error rate of a cloud service exceeds the switching threshold, the operation controller can cause the cloud computing system to shift operations. For example, the operation controller can disallow submissions, configurations, or deployments of new builds of software applications in the cloud computing system. In other embodiments, the operation controller can also prevent allocation of additional processing and/or network bandwidth to the cloud service. Instead, the operation controller would only allow remedial package(s) such as bug fixes, be deployed in the cloud computing system. In further embodiments, the operation controller can also raise an alarm, create an event log entry, or perform other suitable actions.

Several embodiments of the disclosed technology can allow flexible and efficient operational management in cloud computing systems utilizing a single switching threshold based on both the guaranteed values of performance metrics according to the SLA and the associated error budgets. As such, a cloud service provider can simply adjust the error budget in order to deliver cloud services at or above the values of performance metric(s) guaranteed by SLAs while continually providing users with new builds containing updated or new features and functions. In certain embodiments, the cloud computing provider can set error budgets based on historical error rates such that the switching thresholds are only exceeded in the event of catastrophic failures. In other embodiments, the cloud computing provider can also set error budgets based on expected error rates or other suitable parameters.

DETAILED DESCRIPTION

Figure 1:
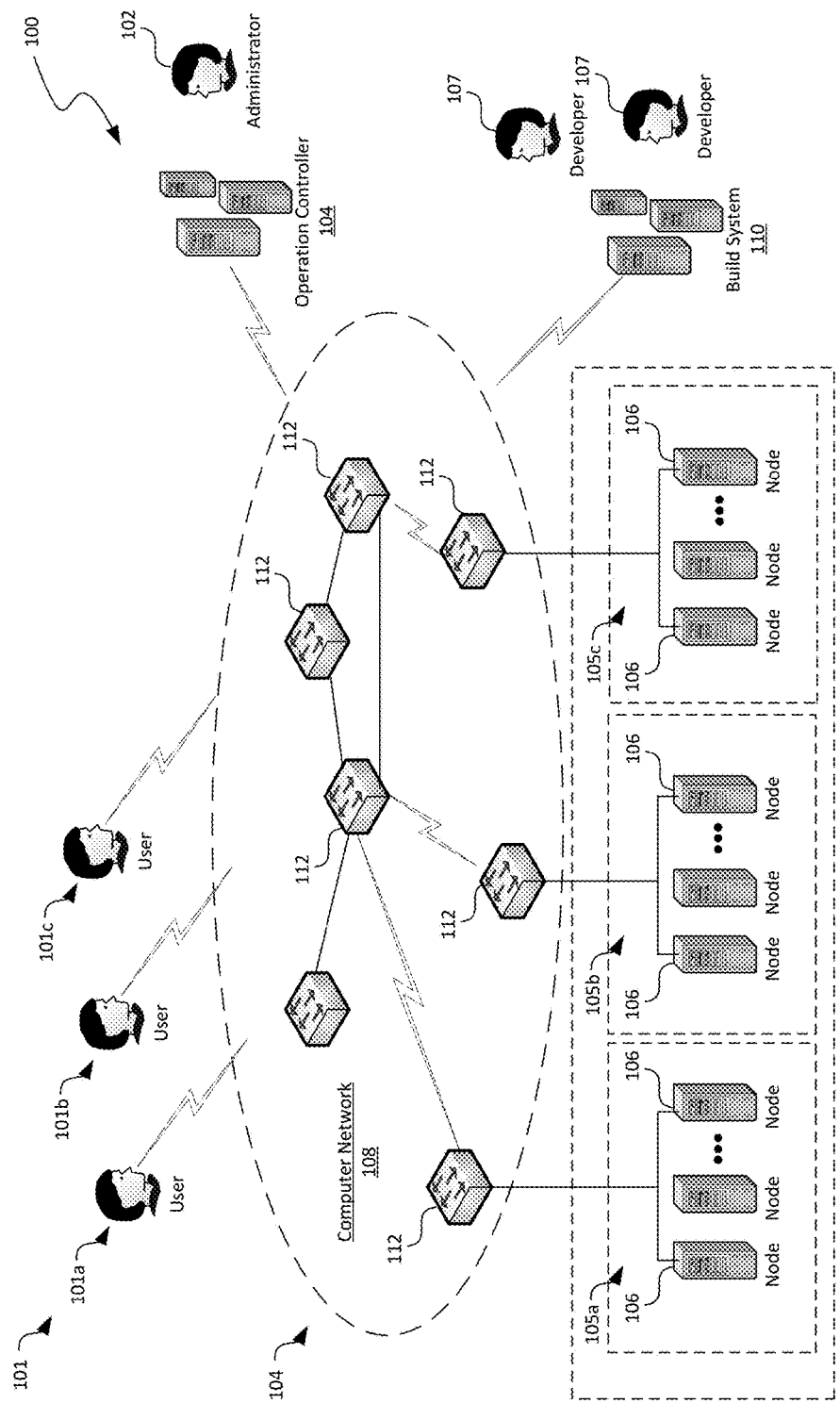
FIG. 1 is a schematic diagram of a cloud computing system having operation shifting control configured in accordance with embodiments of the disclosed technology.

Certain embodiments of computing systems, devices, components, modules, routines, and processes for operational management in cloud computing systems are described below. In the following description, specific details of components are included to provide a thorough understanding of certain embodiments of the disclosed technology. A person skilled in the relevant art can also understand that the disclosed technology may have additional embodiments or may be practiced without several of the details of the embodiments described below with reference to FIGS. 1-5.

As used herein, the term "cloud service" generally refers to computing resources delivered to end users via a computer network (e.g., the Internet). Example cloud services can include software as a service, platform as a service, and infrastructure as a service. Cloud services are typically provided by cloud computing systems remote from the end users. Cloud computing systems can individually include one or more computing clusters having a plurality of network devices that interconnect a plurality of servers or nodes to one another or to external networks (e.g., the Internet). One example of a computing cluster is one or more racks each holding multiple servers in a cloud computing datacenter (or portions thereof) configured to provide cloud services. One or more computing clusters can be interconnected to form a "computing fabric."

The term "network device" generally refers to a network communications component. Example network devices include routers, switches, hubs, bridges, load balancers, security gateways, or firewalls. A "node" generally refers to a computing device configured to implement one or more virtual machines, virtual routers, virtual gateways, or other suitable virtualized computing components. For example, a node can include a computing server having a hypervisor configured to support one or more virtual machines.

Also used herein, the term "service level agreement" or "SLA" generally refers to an agreement between a service provider (e.g., a cloud service provider) and an end user (e.g., a cloud service client) that defines the level of service expected from the service provider. SLAs can be output-based in that SLAs define what an end user would receive but do not define how a service is provided or delivered. SLAs can specify values of a variety of performance metrics that define levels of service a service provider aims to guarantee. Example performance metrics can include when the service is available (a percentage of uptime) and outage limits that can be expected. In the following description, values of performance metrics specified in SLAs are referred to as guaranteed values. In other examples, performance metrics can also include a mean time between failures, a mean time to recovery, or other suitable performance parameters.

Also used herein, an "error budget" generally refers to an allowable percentage of errors that is acceptable based on a guaranteed value of a performance metric according to an SLA. An error budget is not an additional error tolerance over the guaranteed value specified by the SLA. Instead, an error budget occupies or consumes a portion of an allowable error rate based on the guaranteed values specified by the SLA. For example, a guaranteed value of uptime of 90% yields an allowable error rate of 10%. An error budget of 3% would consume a portion (i.e., 30%) of the allowable error rate such that operational switching can be triggered when an actual error rate exceeds a switching threshold of 7%.

Further used herein, the term switching threshold generally refers to a threshold useful for determining a point at which switching of operational modes for providing a cloud service occurs in a cloud computing system. In accordance with embodiments of the disclosed technology, a switching threshold can be derived based on, at least in part, a combination of a guaranteed value according to an SLA and an associated error budget. In certain embodiments, the switching threshold can be derived by subtracting both the guaranteed value of the performance metric and the error budget from another value of the performance metric corresponding to an error-free operation of the cloud service. In other embodiments, the switching threshold can be derived by setting the switching threshold to a sum of the guaranteed value of the performance metric and the error budget. In further embodiments, the switching threshold can also incorporate a user-selected offset or other suitable parameters.

In cloud computing systems, operational modes can be switched between creating software applications deployable to provide a cloud service and improving performance of already deployed software applications by fixing bugs, streamlining processes, or applying other computing optimization techniques. However, determining at which point to switch between these operational modes can be difficult. If operations are focused more heavily on developing new builds of software applications, performance of the existing software applications may suffer. On the other hand, excessive focus on improving performance of existing software applications can delay or limit deployment of new builds with updated or additional features desired by users.

Several embodiments of the disclosed technology utilize a combination of guaranteed values of performance metrics according to SLA and associated error budgets to determine a switching threshold for switching operational modes in cloud computing systems. In certain embodiments, a switching threshold can be determined based on a combination of a guaranteed value of a performance metric and an associated error budget. As such, a single threshold can be relied upon for determining when to switch operational modes in the cloud computing system. In other embodiments, a cloud service provider can also adjust the error budget such that cloud services at or above the guaranteed values can be delivered while continually providing users with new builds with updated features and functions, as discussed in more detail below with reference to FIGS. 1-5.

FIG. 1 is a schematic diagram illustrating a cloud-based computing system 100 having operational management configured in accordance with embodiments of the disclosed technology. As shown in FIG. 1, the computing system 100 can include a computer network 108 interconnecting a plurality of users 101, a computing fabric 104, an operational controller 104, and a build system 110. The computing system 100 can be managed by a cloud service provider to provide cloud services to the users 101. Even though particular components of the computing system 100 are shown in FIG. 1, in other embodiments, the computing system 100 can also include additional computing fabrics (not shown) interconnected with one another, network storage devices, utility infrastructures, and/or other suitable components.

As shown in FIG. 1, the computer network 108 can include one or more network devices 112 that interconnect the users 101, the computing fabric 104, and the service request server 110. Examples of the network devices 112 can include routers, switches, firewalls, load balancers, or other suitable network components. Even though particular connection scheme is shown in FIG. 1 for illustration purposes, in other embodiments, the network devices 112 can be operatively coupled in a hierarchical, flat, "mesh," or other suitable topologies. The computing fabric 104 can include a plurality of nodes 106 arranged into computing clusters 105 (shown individually as first, second, and third computing clusters 105a-105c, respectively). Even though three computing clusters 105 are shown in FIG. 1 for illustration purposes, in other embodiments, the computing fabric 104 can include one, two, eight, sixteen, or any other suitable numbers of computing clusters 105 with similar or different components and/or configurations.

The build system 110 can be configured to facilitate development of one or more new builds of software applications deployable in the computing fabric 104 to provide cloud services to the users 101. As used herein, a "build" or "new build" of software applications generally refers to a piece of software constructed be run on a computer to achieve an observable result. In certain embodiments, the build system 110 can include one or more servers that contain facilities for receiving source codes from developers 107, compiling the received source codes into machine executable codes, checking compatibility of the compiled machine executable codes, and integrating the checked machine executable codes with existing codes. In other embodiments, the build system 110 can also include facilities for version tracking, build sequence tracking, code storage, or other suitable functions. Even though the build system 110 is shown in FIG. 1 as a separate component from the computing fabric 104, in certain embodiments, the build system 110 can be a part of the computing fabric 104 by utilizing one or more nodes 106 or virtual machines hosted thereon in the computing clusters 105. In other embodiments, the build system 110 can be external to the computing system 100.

The operation controller 104 can be configured to switch operational modes in the computing fabric 104 between developing new builds of software applications and improving existing software application deployed in the computing fabric 104 based on a switching threshold derived from a combination of a guaranteed value of a performance metric according to a SLA and an associated error budget. In certain embodiments, the operation controller 104 can be configured to receive data representing the guaranteed value of the performance metric and the error budget from, for instance, an administrator 102 of the cloud service provider.

The operation controller 104 can then be configured to derive the switching threshold based on the received guaranteed value of the performance metric and the error budget. In certain embodiments, the switching threshold can be derived by subtracting both the guaranteed value of the performance metric and the error budget from another value of the performance metric corresponding to an error-free operation of the cloud services. In other embodiments, the switching threshold can be set to a sum of the guaranteed value of the performance metric and the error budget. In further embodiments, the switching threshold can be derived by incorporating user-input offsets or in other suitable manners.

During operation, the operation controller 104 can be configured to monitor a status of the provided cloud services in the computing system 100. Based on the monitored status, the operation controller 104 can determine a current value of the performance metric related to the cloud services. The operation controller 104 can then compare the current value of the performance metric with the switching threshold to determine whether to cause the computing fabric 104 to switch operational modes for providing the cloud services. In certain embodiments, the operational modes can include a first operational mode under which submission, configuration, or deployment of new builds of software applications are allowed. The operational modes can also include a second operational mode under which submission, configuration, or deployment of any new build of the software application is disallowed and only deployment of one or more remedial packages is allowed. The remedial packages can be configured to improve performance of the deployed software applications. In other embodiments, the operational modes can include additional and/or different modes under which the computing fabric operates according to different configurations, based on different resources, or in other different manners.

Periodically or in other suitable fashions, the administrator 102 can also adjust the error budget to achieve a desired operational profile in the computing fabric 104. For example, in certain embodiments, the error budget can be set based on historical error rates related to the cloud services in the computing fabric 104 such that the operational modes are switched only in the event of catastrophic failures. In other embodiments, the error budget can be set based on a change in historical error rates associated with the cloud services with a goal to continuously reducing the error rates over time.

In further embodiments, the error budget can also be set based on a criticality of the cloud services to the users 101 or tolerances of the users 101 toward downtime in the computing fabric 104. For example, if a cloud service (e.g., hosted email exchange) is critical to the users 101, the administrator 102 can then set the error budget to a high value such that a small error rate can trigger switching operations to improving performance of deployed software application. In contrast, if a cloud service (e.g., cloud data backup) can tolerate a long downtime, the administrator 102 can set the error budget low such that only a high error rate would trigger switching operations to improving performance of deployed software application. In yet further embodiments, the administrator 102 or other suitable entities (not shown) can adjust the error budget based on other suitable operational goals.

In operation, the users 101 can utilize various cloud services provided by the nodes 106 of the computing fabric 104 for computing, communications, network storage, or performing other suitable functions. The computing fabric 104 can provide user portals or other suitable types of user interfaces (not shown) to facilitate access and/or management of the various cloud services. For example, user portals can include one or more webpages that show, for instance, usage, operational, or other suitable types of status of the provided cloud services. The operation controller 104 can continuously monitor a status of various cloud services and selectively switch operational modes in the computing fabric 104, as described in more detail below with reference to FIGS. 2A-2B.

Figure 2A:
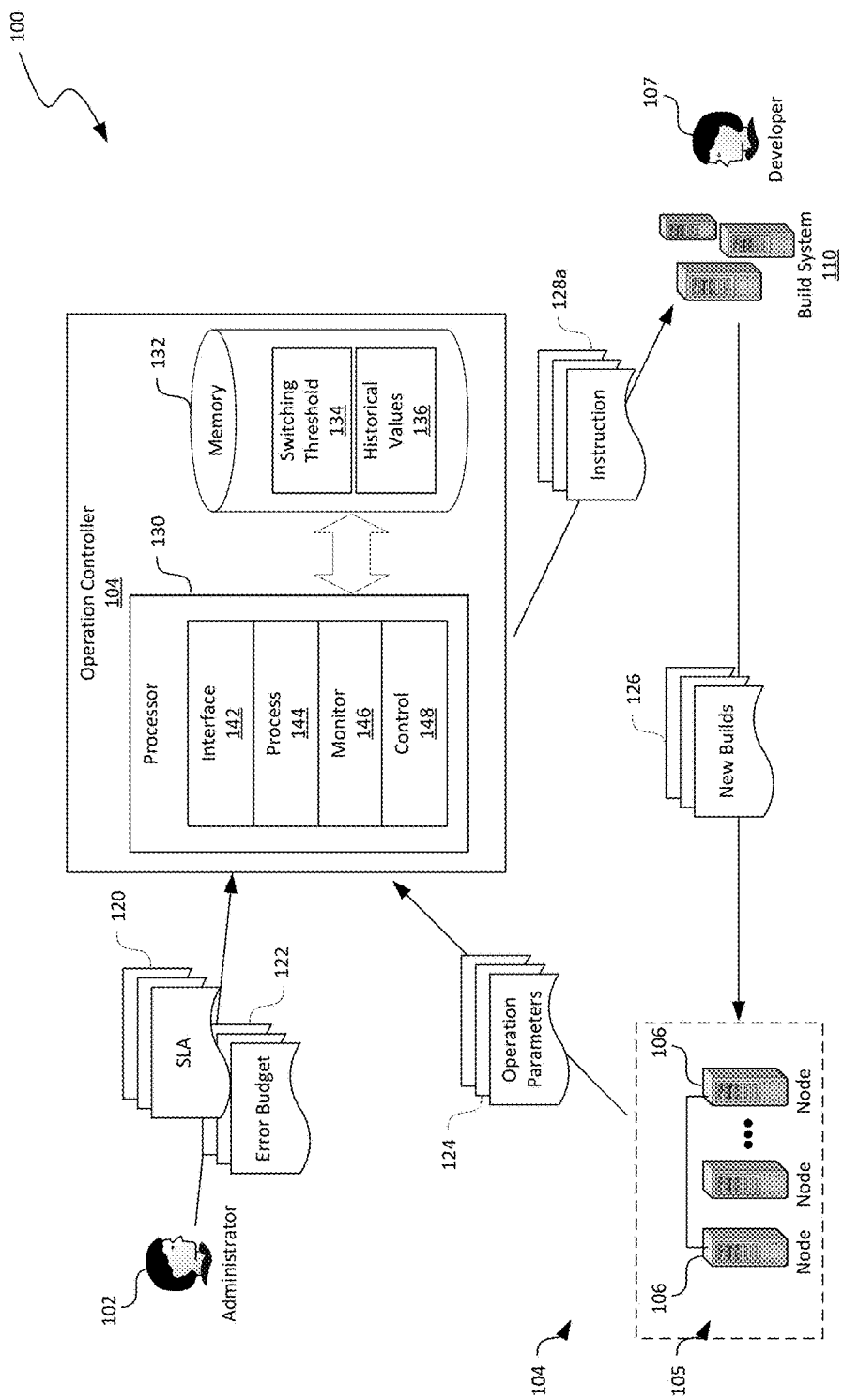
FIG. 2A is a schematic diagram illustrating certain hardware/software components of the cloud computing system in FIG. 1 during one mode of operation.
Figure 2B:
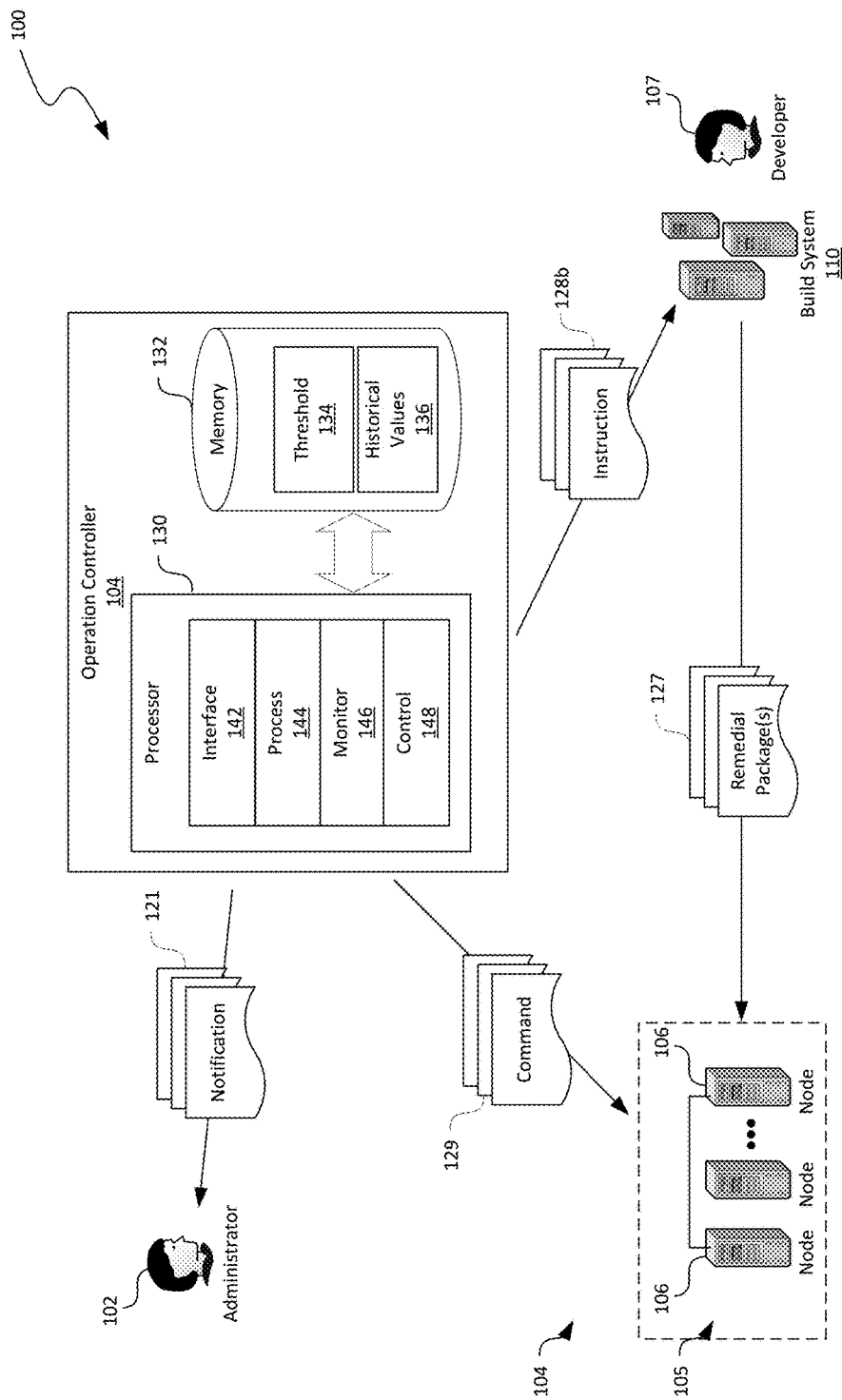
FIG. 2B is a schematic diagram illustrating certain hardware/software components of the cloud computing system in FIG. 1 during another mode of operation.

FIGS. 2A-2B are schematic diagrams illustrating certain hardware/software components of the computing system 100 of the computing system 100 in FIG. 1 during first and second modes of operation, respectively. In FIGS. 2A-2B, certain components of the computing system 100 is omitted for clarity. For example, only one computing cluster 105 is shown in FIGS. 2A-2B for illustration purposes. Also, in FIGS. 2A-2B and in other Figures herein, individual software components, objects, classes, modules, and routines may be a computer program, procedure, or process written as source code in C, C++, C#, Java, and/or other suitable programming languages. A component may include, without limitation, one or more modules, objects, classes, routines, properties, processes, threads, executables, libraries, or other components. Components may be in source or binary form. Components may include aspects of source code before compilation (e.g., classes, properties, procedures, routines), compiled binary units (e.g., libraries, executables), or artifacts instantiated and used at runtime (e.g., objects, processes, threads). In certain embodiments, the various components and modules described below can be implemented with actors. In other embodiments, generation of the application and/or related services can also be implemented using monolithic applications, multi-tiered applications, or other suitable components.

Components within a system can take different forms within the system. As one example, a system comprising a first component, a second component and a third component can, without limitation, encompass a system that has the first component being a property in source code, the second component being a binary compiled library, and the third component being a thread created at runtime. The computer program, procedure, or process may be compiled into object, intermediate, or machine code and presented for execution by one or more processors of a personal computer, a network server, a laptop computer, a smartphone, and/or other suitable computing devices. Equally, components may include hardware circuitry. A person of ordinary skill in the art would recognize that hardware may be considered fossilized software, and software may be considered liquefied hardware. As just one example, software instructions in a component may be burned to a Programmable Logic Array circuit, or may be designed as a hardware circuit with appropriate integrated circuits. Equally, hardware may be emulated by software. Various implementations of source, intermediate, and/or object code and associated data may be stored in a computer memory that includes read-only memory, random-access memory, magnetic disk storage media, optical storage media, flash memory devices, and/or other suitable computer readable storage media excluding propagated signals.

As shown in FIG. 2A, the operation controller 104 can include a processor 130 operatively coupled to a memory 132. The processor 130 can include a microprocessor, a field-programmable gate array, and/or other suitable logic devices. The memory 132 can include volatile and/or nonvolatile media (e.g., ROM; RAM, magnetic disk storage media; optical storage media; flash memory devices, and/or other suitable storage media) and/or other types of computer-readable storage media configured to store data received from, as well as instructions for, the processor 130 (e.g., instructions for performing the methods discussed below with reference to FIGS. 3 and 4). Though not shown in FIG. 2A, the operation controller 104 can also include a display, a touch screen, a keyboard, a mouse, a printer, and/or other suitable types of input/output components configured to accept input from and provide output to, for instance, the support technician 102 in FIG. 1 and/or an automated software controller (not shown).

As shown in FIG. 2A, the memory 132 can include a database containing records of switching thresholds 134 and historical values 136 of performance metrics of cloud services provided by the computing fabric 104. The memory 132 of the operation controller 104 can contain instructions executable by the processors 130 to cause the processors 130 to provide various software components. For example, as shown in FIG. 2, the processor 130 can provide an interface component 142, a process component 144, a monitor component 146, and a control component 148. In other embodiments, the processor 130 can also provide other suitable types of components in addition to or in lieu of the foregoing components.

As shown in FIG. 2A, the interface component 142 can be configured to receive data representing one or more guaranteed values of performance metrics specified in a SLA 120 and associated error budget 122 from the administrator 102. The interface component 142 can also be configured to receive operation parameters 124 from the computing fabric 104 as well as transmit instructions 128a to the build system 110. The interface component 133 can also be configured to store the received operation parameters 124 as historical values 136 in the database of the memory 132. In certain embodiments, the interface component 142 can include a network interface driver. In other embodiments, the interface component 142 can also include an application programming interface and/or other suitable components.

The process component 144 can be configured to derive a switching threshold associated with a cloud service based on the received data representing the SLA 120 and the error budget 122. In certain embodiments, the switching threshold can be derived by subtracting both the guaranteed value of the performance metric and the error budget from another value of the performance metric corresponding to an error-free operation of the cloud service. For example, if a percentage of uptime is 100% for error-free operation, then a switching threshold can be calculated by subtracting a guaranteed value (e.g., 90%) of uptime and an error budget (e.g., 3%) from 100% to yield 7%. In other embodiments, the switching threshold can be derived by setting the switching threshold to a sum of the guaranteed value and the error budget. Thus, a switching threshold can be set to 93% when the guaranteed value is 90% and the error budget is 3%. In further embodiments, the switching threshold can also be set by incorporating user-input offset (e.g., 1%) or in other suitable manners. The process component 144 can then store the derived switching threshold as a switching threshold record 134 in the database in memory 134.

The monitor component 146 can be configured to determine a current value of a performance metric associated with the cloud service based on the received operation parameters 124 from the computing fabric 104. For example, in certain embodiments, the monitor component 146 can include calculation routines that calculate a percentage of uptime over a period based on period of detected downtime contained in the operation parameters. For example, if the operation parameters 124 report a downtime of 15 minutes in a period of 24 hours, the monitor component 146 can determine that a percentage of uptime during this period is (24×60−15)/(34×60), which yields approximately 98.9%. The monitor component 146 can also determine that an error rate in the same period is 15/(24*60), which yields approximately 1%. In other embodiments, the monitor component 146 can also include calculation routines that calculate an average percentage of uptime, a moving average percentage of uptime, or other suitable performance metrics related to the cloud service.

Based on the derived switching threshold and the current value of the performance metric, the control component 148 can be configured to determine whether to switch operational modes in the computing fabric 104. In certain embodiments, when the switching threshold is derived by subtracting both the guaranteed value of the performance metric and the error budget from the value corresponding to an error-free operation of the cloud service, the control component 148 can determine whether the current value of the performance metric exceeds the switching threshold. In response to determining that the current value does not exceed the switching threshold, the control component 148 can cause the computing fabric 104 to maintain a first mode of operation. In the example above, the current value of the error rate is 1% which is lower than the example switching threshold of 7%. As such, the control component 148 can cause the interface component 142 to transmit an instruction 128a to the build system 110 allowing continued operations for generating new builds of software applications.

In response to determining that the current value exceeds the switching threshold, the control component 148 can cause the computing fabric 104 to switch to a second mode of operation, as shown in FIG. 2B. For example, if the current value of the error rate is 8%, which is higher than the switching threshold of 7%, the control component 148 can cause the interface component 142 to transmit another instruction 128b to the build system 110 disallowing any operations related to new builds of software applications. Instead, only remedial packages 127 to existing already deployed software applications are allowed. The remedial packages 127 can include bug fixes, process optimization, or other improvements to the software applications deployed in the computing fabric 104.

In certain embodiments, control component 148 can also transmit a command 129 to the computing fabric 104 to cause the computing fabric 104 to cease allocating additional bandwidth for processing, network, storage, or other types of resources to the cloud service. In other embodiments, the control component 148 can also cause the deployed software applications be reverted to an earlier version. In further embodiments, the control component 148 can cause the computing fabric 104 to reboot certain node(s) 106, migrate virtual machines from one node 106 to another, or perform other suitable functions. Optionally, the control component 148 can also raise an alarm and cause the interface component 142 to transmit a notification 121 to inform the administrator 102 (or other suitable entities) that the switching threshold is exceeded, and that the operational mode of the computing fabric 104 is switching.

Even though the control component 148 is described above using the switching threshold derived by subtracting both the guaranteed value of the performance metric and the error budget from the value corresponding to an error-free operation of the cloud service, in other embodiments, the control component 148 can also utilize a switching threshold set to a sum of the guaranteed value and the error budget. For instance, with a guaranteed value of percentage uptime of 90% and an error budget of 3%, the switching threshold can be set to 93%. As such, in response to determining that a current value of the percentage uptime is 98.9%, which exceeds the switching threshold, the control component 148 can be configured to maintain the computing fabric 104 in the first mode of operation as shown in FIG. 2A. In response to determining that a current value of the percentage uptime is now 92%, which is lower than the switching threshold, the control component 148 can be configured to maintain the computing fabric 104 in the second mode of operation as shown in FIG. 2B.

Figure 3:
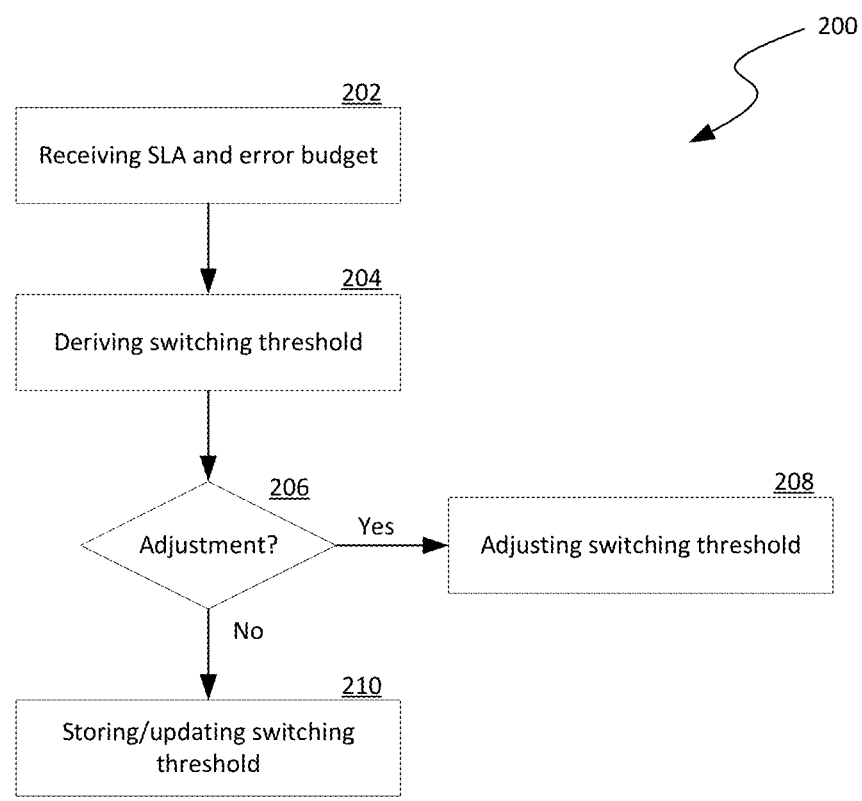
FIG. 3 is a flowchart illustrating a processes of generating an operation shifting threshold in a cloud computing system in accordance with embodiments of the disclosed technology.

FIG. 3 is a flowchart illustrating a process 200 of managing operation in a cloud computing system in accordance with embodiments of the disclosed technology. Even though the process 200 is described in relation to the computing system 100 of FIG. 1, in other embodiments, the process 200 can also be implemented in other suitable computing systems with similar or different components and/or configurations.

As shown in FIG. 3, the process 200 can include receiving guaranteed values of performance metrics according to an SLA and associated error budgets at stage 202. The process 200 can then include deriving a switching threshold at stage 204. Various techniques of deriving the switching threshold can be used, such as those described in more detail above with reference to FIGS. 1 and 2. The process 200 can also include a decision stage 206 to determine whether the derived switching threshold is to be adjusted. For example, in one embodiment, the administrator 102 (FIG. 1) can manually adjust the derived switching threshold with an offset. In other embodiments, other suitable entities can also adjust the derived switching threshold.

In response to determining that there is an adjustment to the derived switching threshold, the process 200 proceeds to adjusting the switching threshold at stage 208. In response to determining that there is no adjustment to the derived switching threshold, the process 200 proceeds to storing and/or updating the switching threshold in, for example, the database in the memory 132 (FIG. 2) at stage 210.

Figure 4:
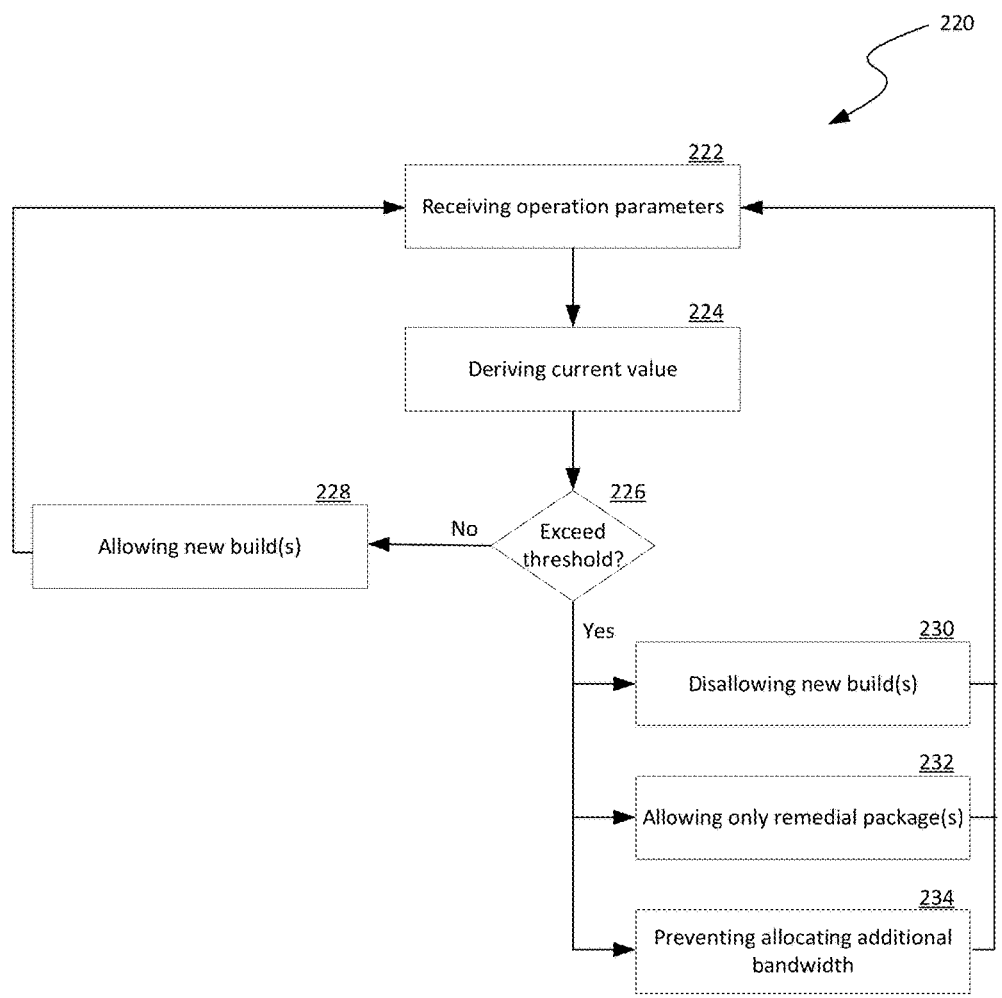
FIG. 4 is a flowchart illustrating a processes of operation control based on an operation shifting threshold of FIG. 3 in a cloud computing system in accordance with embodiments of the disclosed technology.

FIG. 4 is a flowchart illustrating a process 220 of managing operation in a cloud computing system in accordance with embodiments of the disclosed technology. As shown in FIG. 4, the process 220 can include receiving operation parameters from the computing fabric 104 (FIG. 1) at stage 222. The process 220 can then include deriving one or more current values of corresponding performance metrics at stage 224. For example, as described in more detail above with reference to FIG. 2, the current value can include an error rate, or a percentage of uptime derived based on the received operation parameters. The process 220 can then include a decision stage 226 to determine whether the switching threshold is exceeded. In response to determining that the switching threshold is not exceeded, the process 220 proceeds to allowing new builds of software applications configured to deliver cloud services at stage 228 before reverting to receiving additional operation parameters at stage 222. In response to determining that the switching threshold is exceeded, the process 220 proceeds to one or more of disallowing new builds of software applications at stage 230, allowing only remedial packages at stage 232, or preventing allocating additional bandwidth to the cloud service at stage 234. The process 220 can then revert to receiving additional operation parameters at stage 222.

Figure 5:
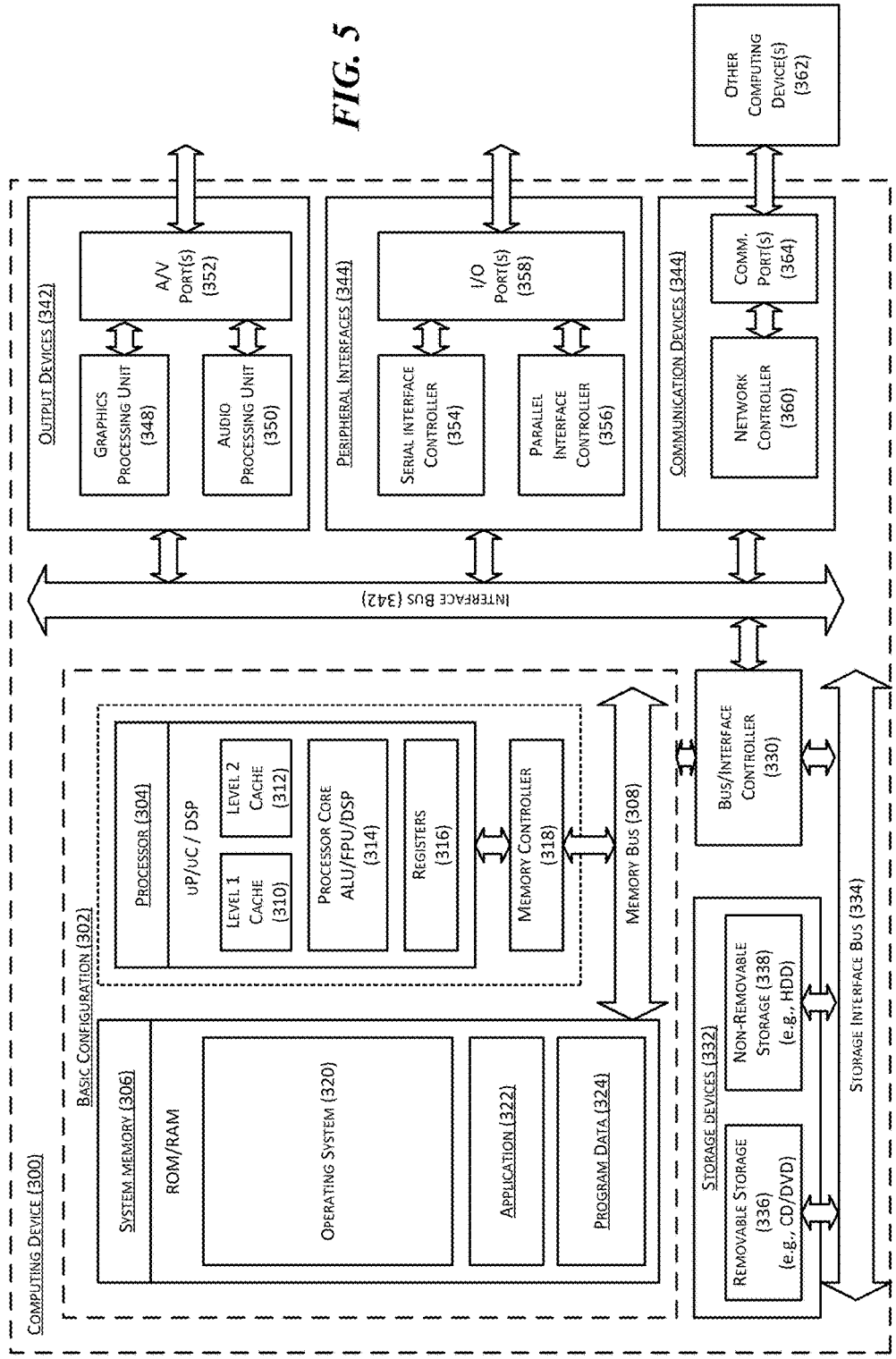
FIG. 5 is a computing device suitable for certain components of the computing system in FIG. 1.

FIG. 5 is a computing device 300 suitable for certain components of the computing system 100 in FIG. 1. For example, the computing device 300 can be suitable for the nodes 106 or the operation controller 104 of FIG. 1. In a very basic configuration 302, the computing device 300 can include one or more processors 304 and a system memory 306. A memory bus 308 can be used for communicating between processor 304 and system memory 306.

Depending on the desired configuration, the processor 304 can be of any type including but not limited to a microprocessor (µP), a microcontroller (µC), a digital signal processor (DSP), or any combination thereof. The processor 304 can include one more levels of caching, such as a level-one cache 310 and a level-two cache 312, a processor core 314, and registers 316. An example processor core 314 can include an arithmetic logic unit (ALU), a floating point unit (FPU), a digital signal processing core (DSP Core), or any combination thereof. An example memory controller 318 can also be used with processor 304, or in some implementations, memory controller 318 can be an internal part of processor 304.

Depending on the desired configuration, the system memory 306 can be of any type including but not limited to volatile memory (such as RAM), non-volatile memory (such as ROM, flash memory, etc.) or any combination thereof. The system memory 306 can include an operating system 320, one or more applications 322, and program data 324. This described basic configuration 302 is illustrated in FIG. 8 by those components within the inner dashed line.

The computing device 300 can have additional features or functionality, and additional interfaces to facilitate communications between basic configuration 302 and any other devices and interfaces. For example, a bus/interface controller 330 can be used to facilitate communications between the basic configuration 302 and one or more data storage devices 332 via a storage interface bus 334. The data storage devices 332 can be removable storage devices 336, non-removable storage devices 338, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media can include volatile and nonvolatile, removable and non-removable media implemented in any method or technology for storage of information, such as computer readable instructions, data structures, program modules, or other data. The term "computer readable storage media" or "computer readable storage device" excludes propagated signals and communication media.

The system memory 306, removable storage devices 336, and non-removable storage devices 338 are examples of computer readable storage media. Computer readable storage media include, but not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other media which can be used to store the desired information and which can be accessed by computing device 300. Any such computer readable storage media can be a part of computing device 300. The term "computer readable storage medium" excludes propagated signals and communication media.

The computing device 300 can also include an interface bus 340 for facilitating communication from various interface devices (e.g., output devices 342, peripheral interfaces 344, and communication devices 346) to the basic configuration 302 via bus/interface controller 330. Example output devices 342 include a graphics processing unit 348 and an audio processing unit 350, which can be configured to communicate to various external devices such as a display or speakers via one or more A/V ports 352. Example peripheral interfaces 344 include a serial interface controller 354 or a parallel interface controller 356, which can be configured to communicate with external devices such as input devices (e.g., keyboard, mouse, pen, voice input device, touch input device, etc.) or other peripheral devices (e.g., printer, scanner, etc.) via one or more I/O ports 358. An example communication device 346 includes a network controller 360, which can be arranged to facilitate communications with one or more other computing devices 362 over a network communication link via one or more communication ports 364.

The network communication link can be one example of a communication media. Communication media can typically be embodied by computer readable instructions, data structures, program modules, or other data in a modulated data signal, such as a carrier wave or other transport mechanism, and can include any information delivery media. A "modulated data signal" can be a signal that has one or more of its characteristics set or changed in such a manner as to encode information in the signal. By way of example, and not limitation, communication media can include wired media such as a wired network or direct-wired connection, and wireless media such as acoustic, radio frequency (RF), microwave, infrared (IR) and other wireless media. The term computer readable media as used herein can include both storage media and communication media.

The computing device 300 can be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. The computing device 300 can also be implemented as a personal computer including both laptop computer and non-laptop computer configurations.

From the foregoing, it will be appreciated that specific embodiments of the disclosure have been described herein for purposes of illustration, but that various modifications may be made without deviating from the disclosure. In addition, many of the elements of one embodiment may be combined with other embodiments in addition to or in lieu of the elements of the other embodiments. Accordingly, the technology is not limited except as by the appended claims.

I claim:

1. A method of managing operations in a cloud computing system having one or more software applications deployed on one or more servers of the cloud computing system and configured to provide a cloud service, the method comprising:
   receiving, at a control server, data representing a guaranteed value of a performance metric of the cloud service according to a service level agreement and data representing an error budget associated with the performance metric;
   deriving, at the control server, a switching threshold based on a combination of the received data representing the value of the performance metric and the error budget;
   determining, at the control server, a current value of the performance metric of the cloud service provided by the cloud computing system;
   determining whether the current value of the performance metric exceeds the derived switching threshold; and
   in response to determining that the current value of the performance metric exceeds the switching threshold, with the control server, deploying one or more remedial packages to the one or more servers at which the software applications are deployed while disallowing submission, configuration, or deployment of any new build of the one or more software applications to any of the one or more servers in the cloud computing system, the remedial packages being configured to improve performance of the already deployed one or more software applications, thereby delivering the cloud service at or above the guaranteed value of the performance metric according to the service level agreement.

2. The method of claim 1 wherein deriving the switching threshold includes subtracting both the guaranteed value of the performance metric and the error budget from another value of the performance metric corresponding to an error-free operation of the cloud service.

3. The method of claim 2 wherein:
   determining the current value of the performance metric includes calculating an error rate of the performance metric for the cloud service; and
   determining whether the current value of the performance metric exceeds the derived switching threshold includes determining whether the calculated error rate exceeds the switching threshold.

4. The method of claim 2 wherein:
   determining the current value of the performance metric includes calculating an error rate of the performance metric for the cloud service;

determining whether the current value of the performance metric exceeds the derived switching threshold includes determining whether the calculated error rate exceeds the switching threshold; and the method further includes allowing submission, configuration, or deployment of a new build of the one or more software applications to the one or more servers in the cloud computing system in response to determining that the calculated error rate does not exceed the switching threshold.

5. The method of claim 2 wherein the method further includes:

maintaining an operational mode of the provided cloud service in response to determining that the current value of the performance metric is equal or greater than the switching threshold.

6. The method of claim 1 wherein deriving the switching threshold includes setting the switching threshold to a sum of the guaranteed value of the performance metric and the error budget.

7. The method of claim 1 wherein:

deriving the switching threshold includes setting the switching threshold to a sum of the guaranteed value of the performance metric and the error budget; and determining whether the current value of the performance metric exceeds the switching threshold includes determining whether the current value of the performance metric exceeds the sum of the guaranteed value of the performance metric and the error budget.

8. The method of claim 1 wherein the method further includes:

preventing allocation of additional bandwidth to the cloud service in response to determining that the current value of the performance metric exceeds the switching threshold.

9. The method of claim 1 wherein the method further includes allowing a new build of the software application to be deployed to the one or more servers in response to determining that the current value of the performance metric does not exceed the switching threshold.

10. A computing device, comprising:

a processor; and a memory containing instructions executable by the processor to cause the computing device to:

in a cloud computing system, monitor a status of a cloud service provided by the cloud computing system having one or more software applications deployed on one or more servers in the cloud computing system to provide the cloud service;

based on the monitored status of the cloud service, determine a current value of a performance metric of the cloud service;

perform a comparison between the determined current value of the performance metric and a switch threshold generated based on a combination of a guaranteed value of the performance metric of the cloud service according to a service level agreement and an adjustable error budget; and in response to detecting that the current value of the performance metric exceeds the switching threshold based on the performed comparison, deploy one or more remedial packages to the one or more servers at which the software applications are deployed while disallowing submission, configuration, or deployment of new build of the software applications to any of the one or more servers in the cloud computing system, the remedial packages being configured to improve performance of the already deployed software applications.

11. The computing device of claim 10 wherein the switching threshold is generated by subtracting both the guaranteed value of the performance metric and the error budget from another value of the performance metric corresponding to an error-free operation of the cloud service.

12. The computing device of claim 11 wherein:

to determine the current value of the performance metric includes to calculate an error rate of the performance metric for the cloud service;

to perform the comparison includes to determine whether the calculated error rate exceeds the switching threshold.

13. The computing device of claim 11 wherein:

to determine the current value of the performance metric includes to calculate an error rate of the performance metric for the cloud service;

to perform the comparison includes to determine whether the calculated error rate exceeds the switching threshold; and the memory contains additional instructions executable by the processor to cause the computing device to, in response to determining that the calculated error rate does not exceed the switching threshold, allow submission, configuration, or deployment of one or more new builds of the software application to the one or more servers.

14. The computing device of claim 10 wherein the switching threshold is set to a sum of the guaranteed value of the performance metric and the error budget.

15. The computing device of claim 14 wherein:

to perform the comparison includes to determine whether the current value of the performance metric is lower than the switching threshold; and in response to determining that the current value of the performance metric exceeds the switching threshold, maintaining the cloud computing system in an operational mode under which submission, configuration, or deployment of one or more new builds of the software application is allowed.

16. The computing device of claim 14 wherein:

to perform the comparison includes to determine whether the current value of the performance metric is lower than the switching threshold; and in response to determining that the current value of the performance metric is lower than the switching threshold, to deploy the one or more remedial packages to the one or more servers at which the software applications are deployed while disallowing submission, configuration, or deployment of new build of the software applications to any servers in the cloud computing system.

17. A method of managing operations in a cloud computing system having one or more software applications deployed on one or more servers of the cloud computing system that are managed by a control server, execution of the one or more software applications providing a cloud service, the method comprising:

determining, at the control server, a current value of the performance metric of the cloud service provided by the cloud computing system;

determining whether the current value of the performance metric exceeds a switching threshold based on a combination of a guaranteed value of the performance metric of the cloud service according to a service level agreement and an error budget associated with the performance metric; and in response to determining that the current value of the performance metric exceeds the switching threshold, with the control server, deploying one or more remedial packages to the one or more servers at which the software applications are deployed while disallowing submission, configuration, or deployment of any new build of the software applications to any of the one or more servers in the cloud computing system, the remedial packages being configured to improve performance of the already deployed software applications, thereby delivering the cloud service at or above the guaranteed value of the performance metric according to the service level agreement.

18. The method of claim 17 wherein deriving the switching threshold includes subtracting both the guaranteed value of the performance metric and the error budget from another value of the performance metric corresponding to an error-free operation of the cloud service.

19. The method of claim 18 wherein:
determining the current value of the performance metric includes calculating an error rate of the performance metric for the cloud service; and
determining whether the current value of the performance metric exceeds the derived switching threshold includes determining whether the calculated error rate exceeds the switching threshold.

20. The method of claim 18 wherein:
determining the current value of the performance metric includes calculating an error rate of the performance metric for the cloud service;
determining whether the current value of the performance metric exceeds the derived switching threshold includes determining whether the calculated error rate exceeds the switching threshold; and
the method further includes allowing submission, configuration, or deployment of a new build of the software applications to the one or more servers in the cloud computing system in response to determining that the calculated error rate does not exceed the switching threshold.

* * * * *